(12) United States Patent
Swoboda

(10) Patent No.: US 7,487,869 B2
(45) Date of Patent: Feb. 10, 2009

(54) ROLLER CONVEYOR SYSTEM AND METHOD OF CONTROLLING IT

(75) Inventor: Werner Swoboda, Boeblingen (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 90 days.

(21) Appl. No.: 11/753,911

(22) Filed: May 25, 2007

(65) Prior Publication Data

US 2007/0272519 A1 Nov. 29, 2007

(30) Foreign Application Priority Data

May 29, 2006 (DE) ...................... 10 2006 025 240

(51) Int. Cl.
*B65G 43/08* (2006.01)
(52) U.S. Cl. ...................... 198/780; 198/817; 193/35 R; 193/37
(58) Field of Classification Search ................. 198/780, 198/783, 789, 790, 817; 193/35 R, 37
See application file for complete search history.

(56) References Cited

U.S. PATENT DOCUMENTS

| | | | | |
|---|---|---|---|---|
| 2,179,047 | A * | 11/1939 | McMurry | 193/35 R |
| 3,857,473 | A * | 12/1974 | Kornylak | 198/789 |
| 4,089,399 | A * | 5/1978 | Webb | 193/35 SS |
| 4,248,341 | A | 2/1981 | Schuck et al. | |
| 4,645,056 | A | 2/1987 | Palazzolo et al. | |
| 5,472,179 | A * | 12/1995 | Wendt et al. | 193/35 R |
| 7,168,546 | B2 * | 1/2007 | Plesh, Sr. | 193/35 R |
| 7,374,036 | B2 * | 5/2008 | Dingler et al. | 198/788 |

FOREIGN PATENT DOCUMENTS

| | | |
|---|---|---|
| DE | 2 124 289 A | 11/1972 |
| DE | 2 245 952 | 3/1973 |
| EP | 1 510 477 A1 | 3/2003 |
| EP | 1 107 443 B1 | 4/2003 |

\* cited by examiner

*Primary Examiner*—James R Bidwell
(74) *Attorney, Agent, or Firm*—Factor & Lake, Ltd.

(57) ABSTRACT

A roller conveyor system includes multiple carrier slides, which have runners, carry readable data memories and in particular are provided for transport of motor vehicle bodies. The roller conveyor system also has readers for reading out the data stored in the data memories, and a roller conveyor to convey the carrier slides. The roller conveyor comprises roller rails, which are arranged parallel to each other, and multiple rollers which are accommodated in the roller rails, and of which at least some can be driven independently of each other by drives, and of which at least some are provided with flanges. According to the invention, the data memories are accommodated in the runners, and the readers in the roller rails.

18 Claims, 3 Drawing Sheets

ROLLER CONVEYOR SYSTEM AND METHOD OF CONTROLLING IT

RELATED APPLICATIONS

The present invention claims the benefit of the filing date of German Patent Application, Ser. No. 10 2006 025 240.3, filed May 29, 2006; the content of which is incorporated by reference herein.

TECHNICAL FIELD

The invention concerns a roller conveyance system, with (a) multiple carrier slides, which have runners, carry readable data memories and in particular are provided for transport of motor vehicle bodies; (b) readers for reading out the data stored in the data memories; and (c) a roller conveyor to convey the carrier slides, the roller conveyor having roller rails, which are arranged parallel to each other, and multiple rollers which are accommodated in the roller rails, and of which at least some can be driven independently of each other by drives, and of which at least some are provided with flanges The invention also concerns a method of controlling a roller conveyor system.

BACKGROUND OF THE INVENTION

In the case of those roller conveyor systems of the above-mentioned kind which are known through use, carrier slides which carry goods to be transported or other objects are conveyed on a roller conveyor. Roller conveyor systems are particularly widely used in the automotive industry, to convey vehicle bodies or parts of them between individual workstations. In the automotive industry, the carrier slides are generally known as skids.

The known roller conveyors have multiple rollers, which are accommodated in roller rails which are arranged parallel to each other. Rollers which are opposite each other in pairs are in general connected to each other by a shaft. On one of the two roller rails, or between the two roller rails, a drive, which drives multiple rollers via chains or belts, is usually provided. Flanges on the rollers ensure that the carrier slides remain guided in the lateral direction during conveying.

By using additional functional units such as transverse movement vehicles, rotary tables and swing tables, complex conveying systems can be built up, and with them the goods or objects to be transported can be, for instance, distributed to different workstations. To control such complex roller conveyor systems, until now central stored program controllers have been used. From sensors which are arranged along the roller conveyor, the controller receives information about whether or not there is a carrier slide over the relevant sensor. In this way, the paths of the carrier slides over the roller conveyor can be followed. Because the controller also controls the transfer events on the functional units, the paths of the carrier slides can still be followed after such transfer events.

Fixing simply constructed data media on cross members of the carrier slides is also known. The known data media have eight prongs which are arranged like a comb and can be removed individually. In this way, numbers can be binary coded. These simple data memories can be read using sensors which are arranged centrally between two roller rails, and which detect the presence or absence of individual prongs. The sensors are directly connected to the controller, so that it obtains, at relatively large spatial intervals, information not only about whether a carrier slide is present at a certain location, but also about which carrier slides are involved.

However, it has been shown that more demanding control tasks cannot be implemented with these known roller conveyor systems, or only at very high cost. For one thing, in the case of the known roller conveyor systems all control tasks are combined centrally in one controller. This makes control slow and liable to faults, and also requires a high programming cost. To be able to identify the carrier slides with good spatial resolution, very many sensors are necessary, and despite the small memory content of the data memories they are relatively expensive to acquire and fit.

The present invention is directed to addressing these and other matters.

SUMMARY OF THE INVENTION

An object of the invention is therefore to improve a roller conveyor system of the above-mentioned kind in such a way that the roller conveyor system can be controlled more flexibly and simply.

According to the invention, this object is achieved in the case of a roller conveyor system of the above-mentioned kind in that the data memories are accommodated in the runners, and the readers in the roller rails.

The arrangement according to the invention of the data memories and readers in the runners and roller rails respectively results in the possibility of (also) using the readers for sufficiently precise determination of the positions of the carrier slides. In this way, the traditional position sensors can be partly or even completely replaced by the readers. In this way, even with very inexpensive data memories and readers, the positions of the carrier slides can be determined to within less than 20 cm.

Additionally, a sensor, which detects the presence of a runner over the whole length of the runner, can be integrated in the reader.

Integration of the readers in the roller rails also makes it possible to choose a very modular structure of the roller conveyor, so that no readers or other modules must be arranged between the roller rails. The fitting and cabling cost is also very much less if the readers are integrated in the roller rails, where there is cabling for power supply and control of the drives for the rollers in any case.

This design simplification in turn makes it possible to control the drives of the rollers in a largely decentralised manner, depending on the read-out data. Such decentralised control requires the readers to be at relatively dense intervals, to be able to monitor the locations of the carrier slides as far as possible without gaps. In this way, the roller conveyor system can be divided into numerous logical route sections, which are separated from each other by readers. Each reader makes it possible to establish whether a carrier slide is in the relevant route section, and if so which carrier slide. This information can be used, for instance, to activate the drives of the same route section or adjacent route sections directly, if a reader detects a carrier slide.

However, decentralised control of the drives does not prevent the data which is read out by the readers also being passed on to a higher-level central controller. This data can be used there, for instance, to display the overall current state of the roller conveyor system on a screen, to make manual intervention by an operator possible.

If the data memories on the runners are each arranged in the same place, the reader can deduce the position of the carrier slide without having to read data from the data memory about where on the carrier slide the data memory is. Location of the carrier slides is thus possible even if the reader detects only the presence of a data memory, but without reading out any data. The readers can provide the information about where the carrier slides are, which is important for the safety of the roller conveyor system, even if the reading process is impossible because of a fault.

In an advantageous embodiment, each drivable roller of the roller conveyor has its own drive, which is preferably in the form of a hub drive which is integrated in the roller. This opens up the possibility that the readers activate the driven rollers which are near the reader individually, and without the involvement of a central controller. Even if several rollers have a common drive, control information can be fed to them from the readers, via a decentralised controller or directly. To transmit the control information, a bus system, which is known per se, can be used.

In another advantageous version of the invention, with the readers the content of the data memories can not only be read, but also changed, in the sense of a write function. In this way, information which is relevant to subsequent workstations or for the conveying path to be followed can be given to the carrier slide on the path.

In general, the conveying path is defined using special functional units, which make it possible to transfer a carrier slide between at least two roller conveyor sections. These functional units can be, for instance, rotary tables, swing tables and transverse movement vehicles. In a specially advantageous embodiment, at least one reader is connected to a controller of the functional unit in such a way that a carrier slide is transferred depending on the data which the reader reads out of the data memory of the relevant carrier slide. In this way, a carrier slide can itself set its path through a complex roller conveyor system, if the appropriate information for controlling the functional units is contained in the data memory. Access by a central controller to the functional unit is then unnecessary, or necessary only in exceptional cases such as serious operating faults.

In principle, all media with which digital information can be stored to a certain extent are suitable as data memories. However, as well as memory chips such as are used in inexpensive transponders for instance, magnetic or optical memories are mainly considered.

Transponders which are obtainable at low cost on the market have the advantage of small dimensions. These in turn make it possible to embed the data memories on the running surfaces of the runners facing the rollers. In this way, a minimum distance from the readers, which are integrated in the roller rails, is achieved, which has a favourable effect on the liability to faults and the precision of the position determination.

It is also the object of the invention to give a method of specially flexible and simple control of a roller conveyor system for conveying carrier slides, which in particular are provided for transport of motor vehicle bodies, the roller conveyor system having a roller conveyor with multiple rollers, of which at least some can be driven independently of each other by drives, and of which at least some are provided with flanges.

A method which achieves this object includes the following steps: (a) reading data out of a data memory, which is arranged on the carrier slide, using a reader which is integrated into the roller conveyor; and (b) control of least one drive by the reader, without participation of a central controller, depending on the data which is read out in step (a).

The above-mentioned advantages and advantageous versions of the roller conveyor system apply correspondingly to the method according to the invention.

These and other objects and advantages will be made apparent from the following brief description of the drawings and the detailed description of the invention.

DETAILED DESCRIPTION OF THE INVENTION

Figure 1:
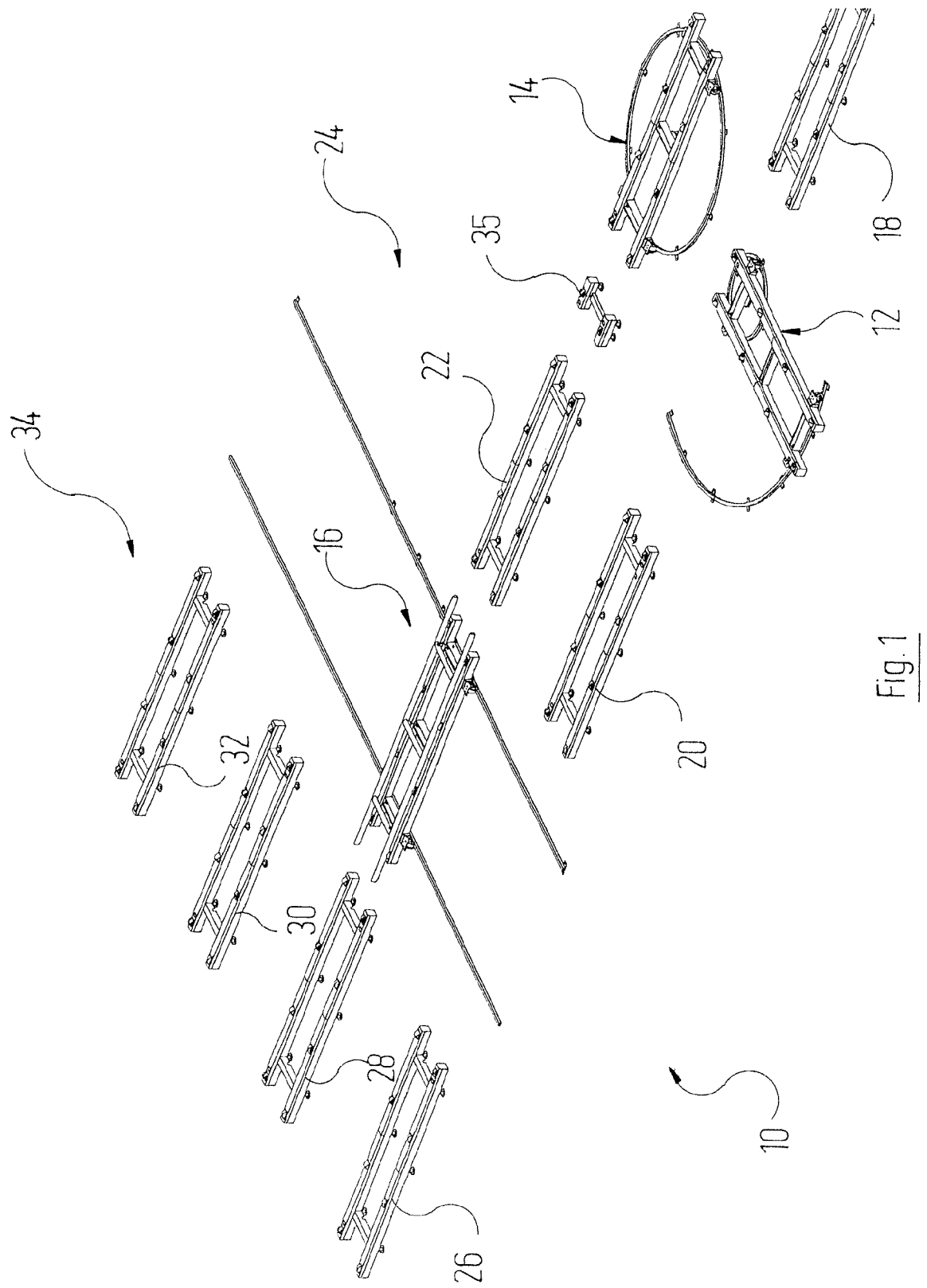
FIG. 1 shows a section of a roller conveyor system, with multiple different functional units in a perspective representation.

While this invention is susceptible to embodiment in many different forms, there is shown in the drawings, and will herein be described in detail, preferred embodiments of the invention while the understanding that the present disclosure is to be considered as an exemplification of the principles of the invention and is not intended to limit the broad aspect of the invention to the embodiments illustrated.

FIG. 1 shows sections of a roller conveyor system, designated 10 as a whole, in a perspective representation. The roller conveyor system 10 is designed to convey skids, with which motor vehicle bodies or parts of them are transported in the automotive industry. The skids (not shown in FIG. 1) are carrier slides, which usually have runners which are joined to each other by crosspieces and run parallel to each other, and fixing possibilities for the objects to be transported.

In the factories of the automotive industry, the skids are transported using the roller conveyor system 10 between, and often also within, various workstations. For instance, the roller conveyor system 10 shown in FIG. 1 could be provided for transporting motor vehicle bodies between a body production station and a surface treatment plant with several treatment lines.

To be able to buffer skids with motor vehicle bodies fixed on them and distribute them to different treatment lines, the roller conveyor system 10 has several functional units, which make transfer of skids between different roller conveyor sections possible. In the case of the embodiment shown in FIG. 1, these functional units are a swing table 12, a rotary table 14 and a transverse movement vehicle 16. Using the swing table 12 and rotary table 14, skids which are fed in via a feed section 18 can be distributed to two buffer sections 20, 22 of a buffer area 24. The transverse movement vehicle 16 then makes possible further distribution of the skids which are waiting in the buffer area 24 to one of the storage sections of a sorting and storage area 34, designated 26, 28, 30, 32. From there the skids are taken over by another conveying system, and conveyed through the appropriate treatment line of the surface treatment plant.

As can be seen in FIG. 1, the roller conveyor of the roller conveyor system 10 is constructed from multiple similar roller conveyor modules. This also applies to the swing table 12, rotary table 14 and transverse movement vehicle 16, the design of which is also based on the same roller conveyor modules. In the case of a roller bracket, designated 35, between the rotary table 14 and the buffer section 22, this is a relatively short roller conveyor module, which contains only two rollers and for instance can be used advantageously where numerous other system parts cross the conveying section or a relatively large gap between the roller conveyor modules must be bridged.

Figure 2:
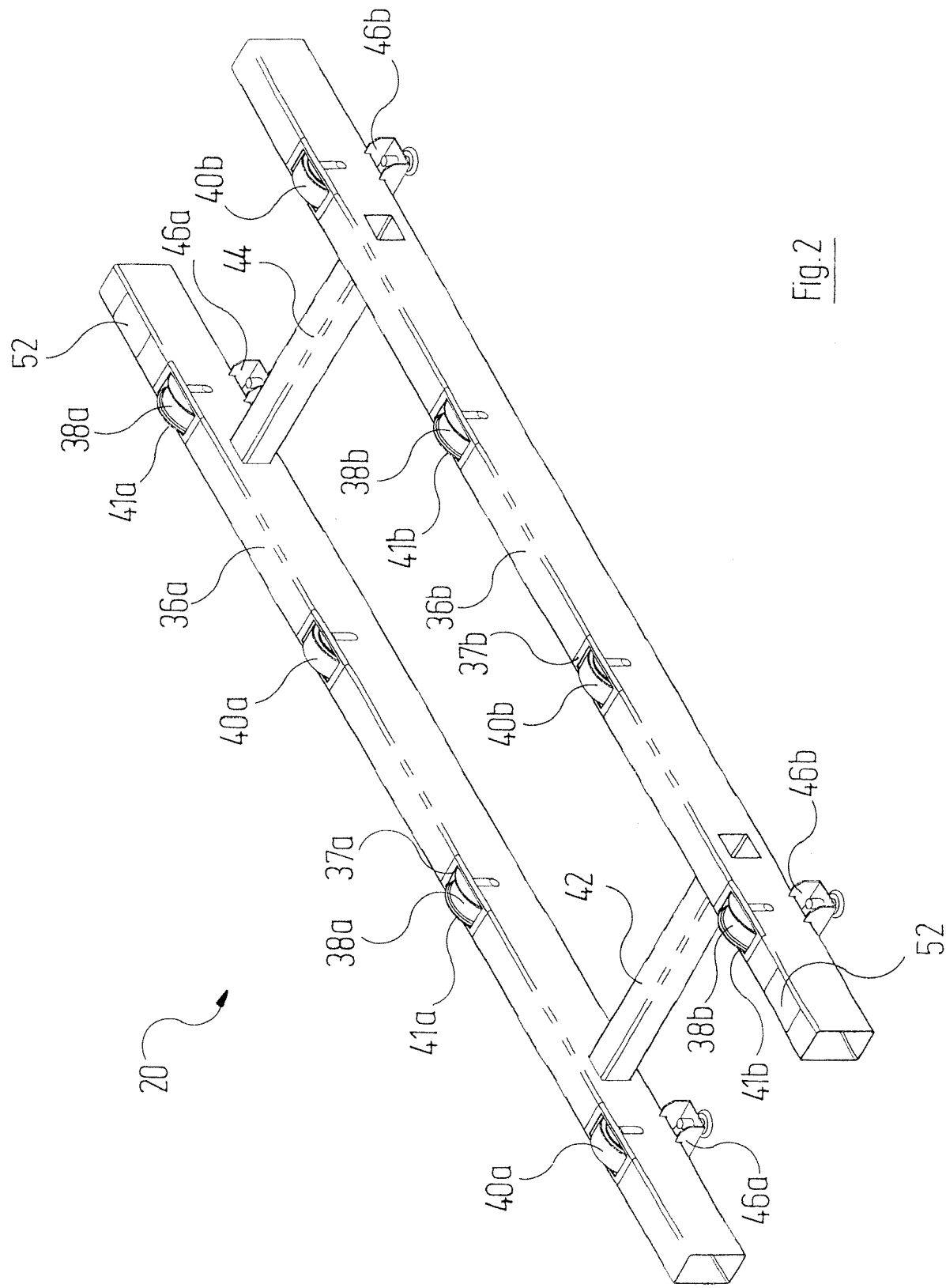
FIG. 2 shows one of the roller conveyor modules out of which the roller conveyor system shown in FIG. 1 is constructed, in a perspective representation.

FIG. 2 shows a single roller conveyor module in a perspective representation. The buffer section 20 has two roller rails 36a, 36b, each of which in the shown embodiment is a hollow profile beam with a rectangular cross-section. In the roller rail 36a, two driven transport rollers 38a and two undriven transport rollers 40a are arranged alternately along the longitudinal direction of the roller conveyor module. In the shown embodiment, only the driven transport rollers 28a are provided with flanges, to guide the skid runners which run on them in the lateral direction.

Each driven transport roller 38a contains its own integrated electrical hub drive, which with the driven transport rollers 38a forms a compact module. When the roller rail 36a is fitted, these modules are inserted into recesses which are exposed on the upper side of the roller rail 36a, e.g. by laser cutting. After these modules are inserted, the remaining gap between the transport rollers 38a and the upper side of the roller rail 36a can be reduced by inserting a rectangular frame part 37a. Something corresponding also applies to the undriven transport rollers 40a, except that they have no hub drive.

The other roller rail 36b is implemented similarly, except that there the driven transport rollers 38b are arranged displaced relative to the driven transport rollers 38a of the roller rail 36a, so that at one height in the longitudinal direction each driven transport roller 38a, 38b is opposite an undriven transport roller 40b and 40a respectively.

The arrangement described above of the driven and undriven transport rollers is only an example. Quite generally, in the case of roller conveyors, this arrangement depends above all on the type and dimensions of the conveying slides to be conveyed, and the weight of the objects to be conveyed on them.

The two roller rails 36a, 36b are rigidly joined to each other by two crosspieces 42, 44. In the case of the shown embodiment, the whole roller conveyor module is fixed on floor supports 46a, 46b, which surround the roller rails 36a, 36b from below. The floor supports 46a, 46b are fixed on an installation floor or similar bearing structure, and their height can be adjusted to compensate for unevennesses in the floor.

Figure 3:
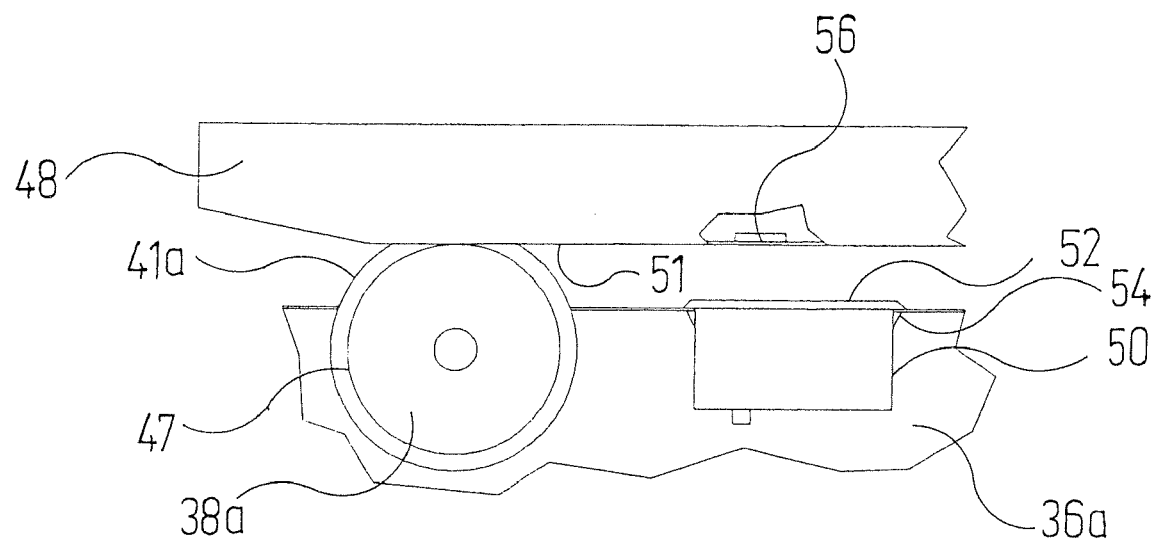
FIG. 3 shows a longitudinal section through a roller rail of the roller conveyor module shown in FIG. 2, with a skid runner running on a roller.

FIG. 3 shows a section through the roller rail 36a along the longitudinal direction. On a running surface 47 of one of the driven transport rollers 38a lies a skid runner 48 with its lower runner surface 51. Next to the driven transport roller 38a, a reader 50, which has a sensor window designated 52, is arranged in the roller rail 36a. The sensor window 52 is embedded in a recess 54 on the upper side of the roller rail 36a.

A data memory in the form of a passive transponder 56 is embedded in the lower runner surface 51 of the skid runner 48, in such a way that the runner surface 51 remains free of projections. The passive transponder 56 has the property that it obtains the necessary energy for communication with the reader 50 and for execution of internal processes exclusively from a field which the reader 50 generates. When triggered by a signal which the reader 50 generates, the transponder 56 can transmit data which is stored in it wirelessly to the reader 50. This data can be, for instance, a skid number, which is assigned uniquely to the relevant skid. Data which refers to the object to be transported can also be stored in the transponder 56. In the case of transport of motor vehicle bodies, this can give, for instance, particular body types, or information about how the body is to be coated in the surface treatment plant.

Figure 4:
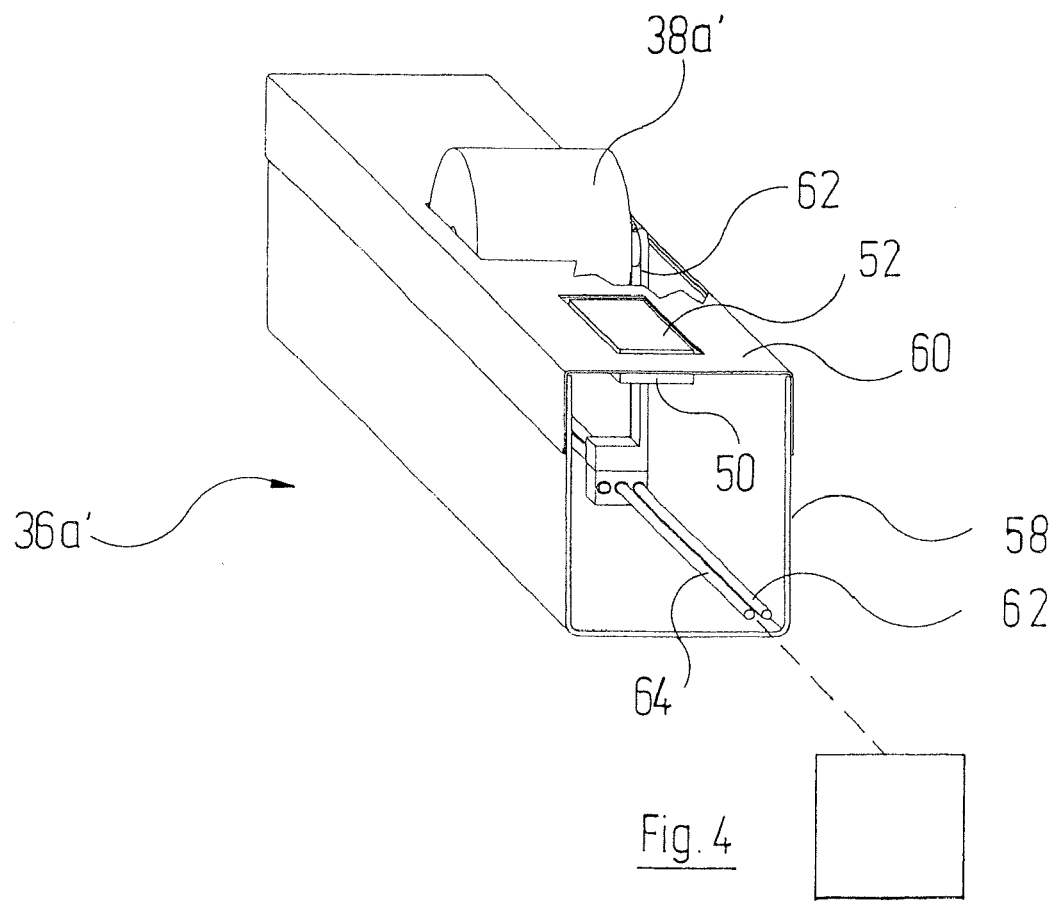
FIG. 4 shows a perspective, partly broken representation of a roller rail with exposed front, according to another embodiment of the invention.]

FIG. 4 shows, in a perspective representation, a section from a roller rail 36a' according to a different embodiment. In contrast to the embodiment described above, the roller rail 36a' does not have a hollow profile beam with a rectangular cross-section, but a U-shaped beam 58. This is covered by a cover 60, which is provided with recesses for the rollers and the sensor fields 52 of the readers 50. In FIG. 4, a driven transport roller 38a' can also be seen, but it is not provided with a flange for lateral guidance of the skid runners 48.

The hub drive of the driven transport roller 38a' is connected via lines which run inside a cable lug 62 to a line 62 for power supply and a data bus 64. In the cable lug 62, lines which connect the reader 50 to the line 62 for power supply and the data bus 64 also run. The data bus 64 is connected to a segment controller, which controls all driven transport rollers of a roller conveyor segment. Several segment controllers work with a higher-level central controller of the roller conveyor system 10.

The roller conveyor system 10 functions as follows:

In a very simple operating mode, the data memories 56 and readers 50 are used only to determine the positions of the skids, without the data contained in the data memories 56 being read out and further processed. The data memories 56 and readers 50 thus replace the position sensors which have been used until now to determine the positions of the skids. Obviously, it is possible to replace only some of the position sensors which have been provided until now by readers 50. For instance, the readers 50 can be used to change the speed, whereas additional position sensors of the traditional kind detect the final positions of the skids.

If a skid is being conveyed via the roller conveyor, at some time the transponder 56, which is embedded in the skid runner 48, scans the sensor window 52 of the reader 50. The transponder 56 responds to the signals which the reader 50 transmits continuously. The response signals of the transponder 56 are detected by the reader 50. The transponder 56 and reader 50 can be designed so that detection does not take place until the transponder 56 is directly adjacent to, e.g. at a distance of less than 20 cm from, the reader 50.

Thus by the detection of the transponder 56 by the reader 50, the presence of a skid over the reader 50 can be precisely detected. This information can be used, for instance, to brake the skid over a specifiable distance, to reach a standstill in a specified new position. For this purpose, the decentralised segment controller transmits appropriate control signals via the data bus 64 to the relevant hub motors of the transport rollers 38a, 38b. The information that a skid is over the reader 50 can also be passed on to the higher-level central controller, e.g. to be displayed there on a screen.

In a preferred second operating mode, the reader 50 also reads out the data which is stored in the transponder 56. On the basis of this data, both in the decentralised segment controllers and in the higher-level central controller numerous functions can be triggered or affected. Through knowing the information about which skid with which object to be transported is at a specified reader, the whole work progress can be logged. Because preferably each roller conveyor module has one or better two readers 50 which are arranged at opposite ends, as FIG. 2 shows, very continuous monitoring of the work progress is possible. The presence of a skid on the roller conveyor module can be monitored if appropriate by a sensor which is integrated in the reader.

Additionally, on the basis of the read-out data, the process paths in the roller conveyor system 10 can be chosen flexibly and dynamically. For instance, if the buffer section 20 is already occupied, the segment controller can activate the swing table 12 and rotary table 14 so that the next skid which is fed in via the feed section 18 is automatically guided to the second buffer section 22 in the buffer area 24.

If the skid or the motor vehicle body which is fixed on it is defective, this information can also be stored in the transponder 56. A reader 50 near a discharge unit can then cause the affected skid to be discharged.

An effect on the travelling speed depending on whether a skid is travelling empty or carrying a motor vehicle body can be caused by the data which is read out in the readers 50.

In the case of the embodiment described above, it was assumed that the readers 50 pass on their information via the data bus 64 to the segment controller, which in turn activate the drives of the transport rollers 38, 38*a*' or the functional units 12, 14, 16. However, there is also the possibility of letting the readers 50 communicate directly, i.e. without the involvement of a decentralised segment controller, with the drives of the transport rollers 38*a*, 38*a*'. For this purpose, it is only necessary that either the drives of the transport rollers or the readers 50 have a suitable interface, which makes direct communication between the readers 50 and the drives of the transport rollers 38*a*, 38*b* possible. Such direct communication does not necessarily require the provision of a dedicated electrical connection, since data can be transmitted via the data bus 64, which is present in any case, directly, i.e. without a decentralised segment controller being connected between them, from the reader 50 to the drives of the transport rollers 38*a*, 38*b*.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

The invention claimed is:

1. A roller conveyor system, comprising:
   a) multiple carrier slides, which have runners, carry readable data memories and in particular are provided for transport of motor vehicle bodies;
   b) readers for reading out the data stored in the data memories; and
   c) a roller conveyor to convey the carrier slides, the roller conveyor having roller rails, which are arranged parallel to each other, and multiple rollers which are accommodated in the roller rails, and of which at least some can be driven independently of each other by drives, and of which at least some are provided with flanges, wherein the data memories are accommodated in the runners, and the readers in the roller rails.

2. The roller conveyor system of claim 1, wherein the data memories are each arranged on the runners at the same location.

3. The roller conveyor system of claim 1, wherein each drivable roller has its own drive.

4. The roller conveyor system of claim 3, wherein the drives are in the form of hub drives which are integrated in the roller.

5. The roller conveyor system of claim 1, wherein the readers can detect the location of a data memory with at least 20 cm precision.

6. The roller conveyor system of claim 1, wherein the readers include an integrated sensor, by which the presence of a runner can be detected over its whole length, is integrated.

7. The roller conveyor system of claim 1, further comprising a decentralised controller to control the drives.

8. The roller conveyor system of claim 7, wherein the control information can be fed from the readers via the decentralised controller to the drives.

9. The roller conveyor system of claim 1, wherein the control information can be fed from the readers directly to the drives.

10. The roller conveyor system of claim 8, wherein the control information is binary coded.

11. The roller conveyor system of claim 8, further comprising a bus system capable of transmitting the control information.

12. The roller conveyor system of claim 1, wherein the content of the data memories can be changed using the readers.

13. The roller conveyor system of claim 1, wherein the roller conveyor has functional units, which make it possible to transfer a carrier slide between at least two roller conveyor sections.

14. The roller conveyor system of claim 13, wherein the functional unit is a rotary table, a swing table, or a transverse movement vehicle.

15. The roller conveyor system of claim 13, wherein at least one reader is connected to a controller of the functional unit in such a way that a carrier slide is transferred depending on the data which the reader reads out of the data memory of the relevant carrier slide.

16. The roller conveyor system of claim 1, wherein the data memories are embedded on the running surfaces of the runners facing the rollers.

17. A method of controlling a roller conveyor system for conveying carrier slides on a roller conveyor which has multiple rollers, of which at least a first group of the rollers can be driven independently of each other by drives, and of which at least a second group of the rollers are provided with flanges, comprising the steps of:
   a) reading data out of a data memory, which is arranged on the carrier slide, using a reader which is integrated into the roller conveyor; and,
   b) controlling at least one drive by the reader, without participation of a central controller, depending on the data which is read out in step a).

18. The method according to claim 17, wherein the reader also controls the path of a carrier slide at a branch point directly, depending on the data which is read out in step a).

* * * * *